N. C. SORENSEN.
TONGS.
APPLICATION FILED MAR. 5, 1918.
1,301,185.
Patented Apr. 22, 1919.
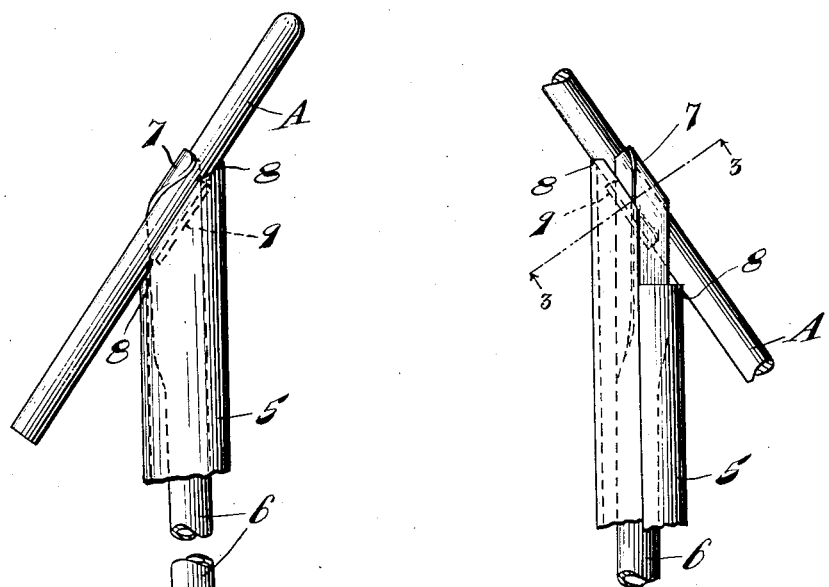
Fig. 1.
Fig. 2.
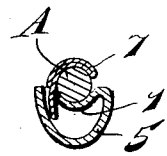
Fig. 3.
Fig. 4.
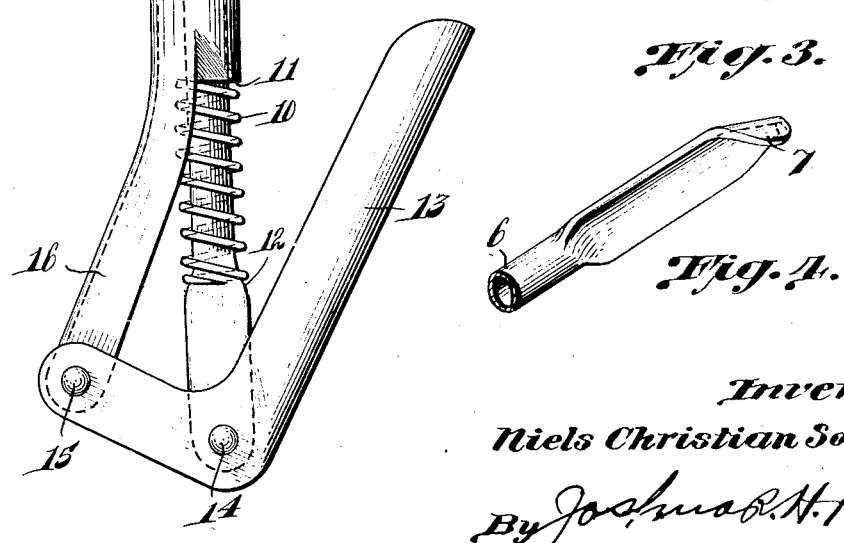
Inventor:
Niels Christian Sorensen,
By Joshua R. H. Potts
Attorney.

UNITED STATES PATENT OFFICE.

NIELS CHRISTIAN SORENSEN, OF CHICAGO, ILLINOIS.

TONGS.

1,301,185.  Specification of Letters Patent.  Patented Apr. 22, 1919.

Application filed March 5, 1918. Serial No. 220,462.

*To all whom it may concern:*

Be it known that I, NIELS CHRISTIAN SORENSEN, a subject of the King of Denmark, who has declared my intention of becoming a citizen of the United States, and a resident of the city of Chicago, county of Cook, and State of Illinois, have invented certain new and useful Improvements in Tongs, of which the following is a specification.

My invention relates to improvements in tongs designed for use especially in the holding of the welding material in acetylene welding.

The object of my invention is the production of a device of the character mentioned, which will be of durable and economical construction, and through the medium of which a stick of welding material of any length may be readily and conveniently held during the welding operation.

Other objects will appear hereinafter.

The invention consists in the combination and arrangements of parts hereinafter described and claimed.

The invention will be best understood by reference to the accompanying drawings forming a part of this specification, and in which, Figure 1 is a partially sectional side elevation of a pair of tongs embodying the invention, Fig. 2, a view similar to the upper end of Fig. 1, showing the opposite side of the device, Fig. 3, a section taken on line 3—3 of Fig. 2, and Fig. 4, a perspective view of the front end of one of the jaws of the device.

The preferred form of construction as illustrated in the drawings comprises a tube 5 in which is slidably mounted a member 6, substantially co-extensive therewith. The front end of member 6 is flattened, as seen in Fig. 4, and the terminal portion thereof is bent back to form a jaw 7. Said jaw is adapted to clampingly engage with a stick A of welding material which is arranged thereunder, so as to be imprisoned between said jaw and the front or corresponding edge of the tube 5, said edge constituting the second jaw of the device. Said edge is recessed at opposite sides as at 8, forming a sort of channel for the reception of the work held in the device, as clearly seen in Fig. 1. Provided at said end of tube 5 is also an inwardly projecting lip 9 of channel form or curved to correspond with the curvature of recesses 8, said lip forming simply a continuation or central portion of the jaw constituted by said recesses 8. With this arrangement it will be seen that the stick of welding material arranged in the tool will be clamped between the jaw 7 and the edges 8 and lip 9, the construction being such that no matter how short the stick may be, the same may be as firmly and securely held in the tool.

The jaw 7 is normally held in clamping position by means of a helical compression spring 10, which embraces the rearward end of the member 6 or stem of said jaw, said spring being interposed between the rearward end 11 of tube 5 and a shoulder 12 formed on the member 6. In the same manner that the member 6 serves as a stem for the jaw 7, the tube 5 serves as a stem for the jaw constituted by edges 8 and lip 9.

Relative shifting of the members 5 and 6, to effect release of the work held by the tool, is obtained through the medium of a handle 13 pivotally connected at 14 with the member 6, and fulcrumed at 15 to an extension 16 on the member 5. The members 13 and 16 constitute a sort of grip or handle for the device, the jaw 7 being moved to release the work by simply depressing the member 13. The jaws are preferably disposed at an angle, as seen, in order to hold the stick of welding material at an angle, since it has been found that this is the most convenient position of the stick during the welding operation.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. In a device of the class described, the combination of a pair of jaws having parallel longitudinally shiftable stems, relative shifting of said stems effecting movement of said jaws toward and from each other; and means for yieldingly holding said jaws in clamping relation with each other, substantially as described.

2. In a device of the class described, the combination of a pair of jaws having parallel longitudinally shiftable stems, relative shifting of said stems effecting movement of said jaws toward and from each other; and a helical compression spring for yieldingly holding said jaws in clamping relation with each other, substantially as described.

In testimony whereof I have signed my name to this specification in the presence of two subscribing witnesses.

NIELS CHRISTIAN SORENSEN.

Witnesses:
JOSHUA R. H. POTTS,
HELEN F. LILLIS.